United States Patent [19]
Arai

[11] 3,757,187
[45] Sept. 4, 1973

[54] RECORD-REPETITIVE-PLAYBACK TYPE UNIVERSAL POSITION CONTROL SYSTEM

[75] Inventor: Nobuhito Arai, Tokyo-to, Japan

[73] Assignee: Ishikawajima-Harima Jukogyo Kabushiki Kaisha, Tokyo-to, Japan

[22] Filed: Oct. 14, 1971

[21] Appl. No.: 189,207

[30] Foreign Application Priority Data
Mar. 25, 1971 Japan.............................. 46/17393

[52] U.S. Cl................................. 318/562, 318/568
[51] Int. Cl...................... G05b 11/32, G05b 19/42
[58] Field of Search............................ 318/568, 562

[56] References Cited
UNITED STATES PATENTS
3,576,540  4/1971  Fair et al. ........................ 318/562 X
3,372,568  3/1968  Lemelson........................ 318/562 X Primary Examiner—T. E. Lynch
Attorney—Scrivener, Parker, Scrivener and Clarke

[57] ABSTRACT

A record-repetitive-playback or -reproduction type universal position control system wherein the operation sequence of each control shaft of a servomechanism is read out from an electronic or magnetic storage device into which is stored the operation sequence, so that each control shaft may be repetitively actuated.

4 Claims, 1 Drawing Figure

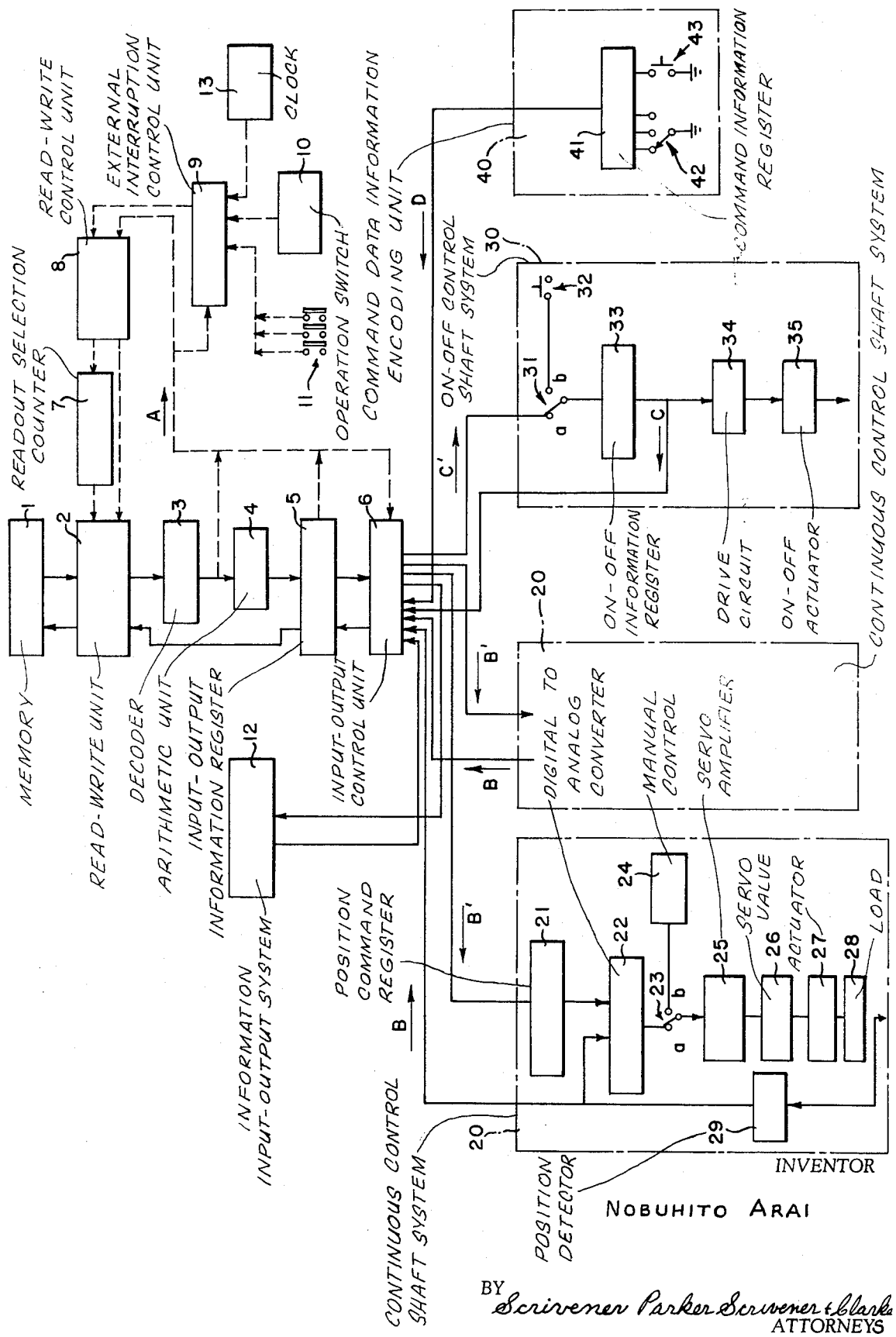

RECORD-REPETITIVE-PLAYBACK TYPE UNIVERSAL POSITION CONTROL SYSTEM

The present invention relates to generally a servo-mechanism having a plurality of control shafts, and more particularly a record-repetitive-playback or -reproduction type universal position control system in which the positions in the space and the operation sequence of each control shaft are read out simultaneously or individually in accordance with a programmed method from an electronic or magnetic storage device into which are stored in synchronism with the motion of the controlled object the magnitudes of the resolved components of the motion of each control shaft of the servomechanism which is to be controlled when said servomechanism is manually operated, so that each control shaft may be repetitively actuated.

There are two types of the record-repetitive-playback type position control systems. One type is such that information representative of the positions or position data information is stored by the potentiometers or the like in analog manner and the sequence of information read out is determined by a drum switch or pinboard while the other type is such that the position data information is converted into the digital quantities to be stored onto the magnetic tapes or drums.

In the former system, unless the positions of the drum switch strikers or the pins of the pinboard are changed, the information remains unchanged so that only unique information is supplied regardless of the conditions of the controlled object and its associated external equipment. Thus the former system is less flexible in operation. In the latter system, the information stored in the memory storage device is played back in the same sequence as it is stored so that an appropriate processing of information in response to the external input conditions cannot be made. The latter system has also the defects of the former system.

The present invention was made to overcome the above problems encountered in the prior art position control system, and provides a very flexible and highly sensitive record-repetitive-playback or -reproduction type universal position control system characterized in that said position control system has an information processing system comprising a computer storage device from which information may be read out and into which information may be written, a reader-writer unit for reading out information from said computer storage device and writing information into said computer storage device, a decoder, an arithmetic unit, an input-output information register and an input-output control unit all of which are coupled in the order named; and a control system comprising an external interruption control unit for receiving external inputs, a read-write control unit and a read selection counter all of which are coupled in the order named. The information processing system is controllable by said control system. A command data information encoding unit comprising a command information register for receiving external inputs is coupled to said information processing system so as to transmit thereto command information. Continuous and on-off control shafts of a servomechanism are coupled to said information processing system in such a way that information of each control shaft may be stored in said computer storage device in said information processing system in synchronism with the motions of said control shafts. The information is transmitted to said continuous and on-off control shafts from said computer storage device in response to the control information stored in said computer storage device so that repetitive reproduction may be attained at a speed having a predetermined ratio to the information storage speed.

The present invention will become more apparent from the following description of one preferred embodiment thereof taken in conjunction with the accompanying single figure of drawing which is a block diagram of a record-repetitive reproduction type universal position control system.

Reference numeral 1 designates a memory; 2, a reader-writer unit for reading stored information and writing information into the memory; 3, a decoder; 4, an arithmetic unit; 5, an input-output information register; 6, an input-output control unit; 7, a read out selection counter; 8, a read-write control unit; 9, an external interruption control unit; 10, an operation switch; 11, external switches; 13, a clock; 20, continuous control shafts; 30, an on-off control shaft; 40, a command data information encoding unit; 41, a command information register; 42, a rotary switch; and 43, a push-button.

Data information processing system comprises a magnetic storage device 1 such as core memory which stores the signals or bits "1" and "0" as the one unit or word; a reader-writer 2 for reading out and writing information into the magnetic storage device 1; a decoder 3 consisting of NAND gates; an arithmetic unit 4; an input-output storage or register 5 consisting of a plurality of flip-flop circuits; and an input-output control unit 6 consisting of a plurality of NAND gates. The output information from the arithmetic unit 4 is added to the information stored in the input-output register 5. A control system comprises a read out selection counter 7 for selecting the desired information which consists of a register, a selection circuit, a read amplifier, and a write amplifier; a read-write control unit 8 consisting of a plurality of NAND gates, a plurality of external switches 11, an operation switch 10 and an external interruption control unit 9 which receives pulses from a clock 13 and the operation switch 10. The signals are applied from the units 7 and 8 to the unit 2 in the data information processing system so as to control it. An input-output system 12 such as a paper tape reader and a paper tape punch is provided to transmit the information to the input-output control unit 6 and to receive the information from it. The control signal A from the decoder 3 is applied to both of the read-write control unit 8 and the external interruption control unit 9. The control signal A together with the signal from the input-output register 5 are also applied to the input-output control unit 6. The position signals B' are applied from the unit 6 to a plurality of continuous control shafts 20 (in the instant embodiment two shafts 20 are illustrated); and the on-off signals C' are applied from the unit 6 to a plurality of on-off control shafts 30 (only one is illustrated in the instant embodiment). The detected-position signals B, the detected-on-off signals C and the command signals D are applied to the input-output control unit 6 from the continuous and on-off control shafts 20 and 30 and a command unit 40 to be described in more detail hereinafter. These signals B, C and D are transmitted from the unit 6 to the magnetic storage device 1 through th input-output information register 5 and the reader-writer 2.

Each of the continuous control shafts 20 comprises a position command register 21 which stores the signals or bits "1" and "0" consisting of a plurality of flip-flop circuits; a digital-to-analog converter 22 which is adapted to produce the analog voltage representing the difference between the content in the register 21 and the signals detected by a position detector 29; a servo amplifier 25 for applying the current in proportion to said analog voltage to a servo valve 26, the amplifier 25 being coupled to the D-A convertor 22 through a switch 23 which is actuated by a manual control 24; an actuator 27 such as a hydraulic cylinder coupled to the servo valve 26 for converting the electrical signals into the mechanical signals; and a load 28 coupled to the actuator 27, and to the detector 29 which converts the mechanical signals into the absolute binary signals or feedback signals to be applied to the D-A convertor 22 and to the input-output control unit 6 as the detected position signals B. The D-A converter 22 compares the instruction from the register 21 with the feedback signals from the detector 29 and reduces the difference between them to zero.

The on-off control shaft 30 comprises a switch 31 which is actuated by a manual control 32 such as a push button; an on-off information register 33 which consists of one flip-flop circuit and is coupled to the switch 31 and to a drive circuit 34 which in turn is coupled to an on-off actuator 35 such as a solenoid valve. When the content of the register 33 is "1," the drive circuit 34 is actuated to actuate the actuator 35, and the on-off signals C are applied to the input-output control unit 6 from the on-off information register 33.

The command information encoding unit 40 comprises a command information register 41 consisting of a plurality of flip-flop circuits coupled to a rotary switch 42 and a push botton 43. The signals "1" and "0" are set into the register 41 from the push button 43, and the command signals D are applied to the input-output control unit 6 from the register 41. In the block diagram, the solid lines designate the information transmission lines while the broken lines the control signal transmission lines.

Next the mode of storing the information of the motions or rotations of the control shafts into the magnetic storage device will be described. The moving contacts of the switches 23 and 31 are switched to the fixed contacts b, and in response to the signals from the manual control 24, the load 28 is actuated through the servo-amplifier 25, the servo valve 26 and the actuator 27. The signals representative of the motion of the load 28 are converted by the detector 29 into the binary signals and transmitted to the input-output control unit 6. The on-off signals generated by the manual control 32 are applied to the drive circuit 34 and the actuator 35 through on-off information register 33 so as to actuate the drive circuit 34 and the actuator 35 while the content in the on-off information register 33 is transmitted to the input-output control unit 6. The binary signals generated by the rotary switch 42 and the push button switch 43 are also transmitted to the input-output control unit 6 through the register 41. Thus it is seen that a set of the detected position signals B from a plurality of continuous control shafts 20, the detected on-off signals C from a plurality of on-off control shafts 30 and the command signals D from the command data encoding unit 40 represents a state and conditions of the position control system in accordance with the present invention.

The above information or signals transmitted to the input-output control unit 6 are selected by the control signals A. That is, in the magnetic storage device 1 there is stored previously by an input-output system 12 the control program for selecting the information transmitted to the input-output unit 6, the formats of the information stored in the unit 6, the selection of the addresses in the magnetic storage device 1 where the information is stored, the format of the information read out by the input-output control unit 6 from the magntic storage device 1, and the selection of the destinations to which the read out information should be transmitted. More particularly, in case of the position teaching by the operation switch 10, the corresponding flip-flop circuits and NAND gates are actuated by the external interruption control unit 9 so that the corresponding gates in the read-write control unit 8 are opened or closed. Therefore the content of the read out selection counter 7 is changed and the reader-writer 2 is controlled in response to this changed content of the counter 7 and the desired information is read out from the magnetic storage device 1. The read out information is decoded by the decoder 3, and the gates in the input-output control unit 6, the read-write control unit 8 and the external interruption control unit 9 are opened or closed in response to the control signals A. In like manner, the gates in these units 6, 8 and 9 are opened or closed in response to the control information contained in the signals selected by the read out selection counter 7 so that the detected position signals B, the detected on-off signals C and the command signals D are processed and stored into the magnetic storage device 1 through the input-output control unit 6, the input-output information register 5 and the reader-writer 2. It should be noted that the storage of these signals B, C and D may be effected whenever a specific push button in the operation switch 10 is depressed, that is these signals may be stored at random time intervals and that the storage may be also effected at a predetermined discrete short time interval in response to the clock signals from the clock 13.

The binary signals stored in the magnetic storage device 1 include the control signals or information previously inserted through the information input-output system 12 and the data information inserted into and extracted out of the magnetic storage device in response to the control information. The control information controls the external interruption and information read out and recording or writing while the data information includes the position, on-off and command information. Tens or hundreds of steps each consisting of a plurality of detected position information B, a plurality of detected on-off information C and the command information D are stored in the magnetic storage device 1.

Next the mode of repetitive reproduction or playback in accordance with the preset invention will be described. The switches 23 and 31 are switched to the contacts a, the repetitive reproduction signals from the operation switch 10 are applied to the read-write control unit 8 and the read out selection counter 7 through the external interruption control unit 9 so as to control the reader-writer 2 to read out the control information from the magnetic storage device 1. The read out information is decoded by the decoder 3 and the output from this decoder 3 controls the read-write control unit 8, the read out selection counter 7 and the reader-writer 2 to read out the position information in the corresponding step, which is transmitted to the position command register 21 through the decoder 3, the arithmetic unit 4, the input-output information register 5 and the input-output control unit 6. In like manner, the on-off information is transmitted to the on-off command register 33.

The position information stored in the register 21 is transmitted to the D-A converter 22 where it is converted into the analog signals to actuate the load 28 through the switch 23, the servo-amplifier 25, the servo valve 26 and the actuator 27. The mechanical displacement or motion of the load is converted by the detector 29 into the digital electrical signals which are fed back to the D-A converter 22 so that the each continuous control shaft 20 is controlled in response to the position command information B' transmitted from the input-output control unit 6 to the register 21.

The on-off command information C' transmitted to the on-off information register 33 from the input-outut control unit 6 actuates the actuator 35 through the drive circuit 34.

The data information in each step is sequentially read out in a manner described above so that the continuous and on-off control shafts 20 and 30 are driven to determine the positions.

The data information in each step includes the command or instruction information in addition to the position and on-off information, and the command information is decoded by the decoder 3 so that the read-write control unit 8 is controlled in response to the control signals A. Thus, the position and on-off informations in each step stored in the magnetic storage device are sequentially and correctly read out, and furthermore read out in a sequence different from that in the storage because of the command information D in each step.

When one of the external switches 11 is actuated, the corresponding flip-flop circuit in the external interruption control unit 9 is set so that the corresponding control information is read out from the magnetic storage 1 through the read-write control unit 8, the read out selection counter 7 and the reader-writer 2, and the data information designated by the magnetic storage device 1 is selectively read out. The read out signals are transmitted to the continuous and on-off control shafts 20 and 30 in a similar manner described above for position control It is of course understood that the present invention is not limited by the embodiment described hereinabove by reference to the accompanying drawing. For example, the detector may be coupled to the output of the actuator in the continuous control shaft, and variations and modifications may be effected without departing from the scope of the present invention.

The following advantages may be accured from the present invention.

I. Each of the continuous and on-off control shafts in a servomechanism are simultaneously or independently driven manually so that the locus or path and positions in the space relative to a reference position in the space are stored in the magnetic storage device as the variations of each control shaft in synchronism with the operation of the servo-mechanism and may be sequentially read out at a speed having a predetermined ratio to the storage speed, whereby the stored information may be repetitively reproduced. Therefore, when the control information previously stored in the storage device is decoded by decoder, the data information in various formats may be handled only by rewriting or modifying the control information in order to effect the input-output control of the data information.

II. The command or instruction information is stored as one of the data informations when the motions are recorded, and the command information is read out in reproduction so as to control the position information. Therefore, the sequence in reading out the position and on-off informations is independent of the sequence of the stored position informations. Therefore, any desired position information may be read out independently of the sequence of the stored information and applied to the servomechanism so that jump, repetition and read out of specific operation information may be provided.

III. The data information to be read out may be directly selected by the read-write control unit which is actuated by the external switches, so that the motion corresponding to the arbitrary position information may be selected and reproduced by the external switches which stored the position informations in the sequence of the actuations of each control shaft.

IV. The arithmetic operations required for the position information may be carried out by the arithmetic unit inserted between the reader-writer and the input-output information register in the process of position information read out so that the mechanical speed of each control shaft may be variably controlled by changing the time interval of the divided outputs and linear interpolation functions which are given to the position instruction register or storage in order that each control shaft may have a designated displacement at the same time by obtaining the speed of each control shaft from the information representative of a given spatial position and the position information in the next step. Furthermore, when the position command information is compared with the detected position information and coincides with it, the coincidence check for reading out the next step information may be attained so that the operation speed of each control shaft may be automatically changed in response to the displacement of each control shaft. Thus, the positions in the space may be determined simultaneously by all control shafts.

What is claimed is:

1. A record- repetitive-playback position control system, comprising
a. at least one continuous servomechanism control shaft (28);
b. an on-off servomechanism control shaft (35);
c. information processing means, including
   1. memory means for storing digital data;
   2. a read-write unit (2);
   3. a decoder (3);
   4. an arithmetic unit (4);
   5. an input-output information register (5);
   6. an input-output control unit 6; and
   7. means connecting between said memory and said input-output control unit said read-write unit in series succession said decoder, said arithmetic unit and said input-output register;

d. control means for controlling the operation of said information processing means, including
  1. an external interruption control unit (9);
  2. a read-write control unit (8);
  3. a read-out selection counter unit (7); and
  4. means connecting between said external interruption control unit and said information read-write unit in series succession said read-write control unit and said read-out selection counter;

e. means for storing in said memory in synchronism with the operation of said control shafts information corresponding with the instantaneous position of said control shafts, including
  1. means including a first manually operable positioning means (24) for selectively positioning said continuous control shaft in a number of selected positions;
  2. position detector means (29) responsive to the instantaneous position of said continuous control shaft connected with said input-output control unit for recording in said memory detected position signals (B) corresponding with said continuous control shaft position;
  3. means including a second manually operable positioning means (32) fr operating said on-off control shaft to one of its on and off conditions;
  4. means including an on-off information register (33) connected with said input-output control unit for recording in said memory on-off signals (C) corresponding with the instantaneous condition of said on-off control shaft; and
  5. means including a command data information encoding unit (40) connected with said input-output control unit for recording in said memory in synchronism with said detected position signals and said on-off signals a command signal (D);
  6. switch means (23, 31) operable from a store condition to a playback condition for disconnecting the positioning means of said continuous control shaft from first and second manually operable positioning means, respectively, and for connecting said shaft positioning means with said input-output control unit; and
  7. means (10) operable when said switch means is in the playback condition for transmitting to the positioning means of said servomechanism control shafts selected detected position and on-off signals stored in said store means, whereby repetitive reproduction may be obtained at a speed having a predetermined ratio to the information storage speed.

2. Apparatus as defined in claim 1, wherein said means for storing said detected position signals, said on-off signals and said command signals includes operating switch means (10) for transmitting to the store means the signals contained in said input-output control unit and said input-output register.

3. Apparatus as defined in claim 2, and further including program control means (12) connected with said input-output control unit for storing in said memory a program control signal, said control signal being operable to control the external interruption control unit and the information read out means.

4. Apparatus as defined in claim 3, and further including external switch means (11) for controlling the operation of said external interruption control circuit, whereby the corresponding control information is read out from the memory via the read-write control unit, the read out selection counter and the read-write unit.

* * * * *